United States Patent [19]

Hasegawa

[11] Patent Number: 4,737,678

[45] Date of Patent: Apr. 12, 1988

[54] COOLING SYSTEM FOR PROJECTION TELEVISION RECEIVER

[75] Inventor: Shinichi Hasegawa, Tokyo, Japan

[73] Assignee: Pioneer Electronic Corporation, Tokyo, Japan

[21] Appl. No.: 893,278

[22] Filed: Aug. 5, 1986

[30] Foreign Application Priority Data

Aug. 6, 1985 [JP] Japan ................................ 60-172653

[51] Int. Cl.$^4$ ......................... H01J 29/87; H04N 5/72

[52] U.S. Cl. ......................................... 313/36; 313/44; 358/250

[58] Field of Search ........................ 313/35, 36, 44, 46, 313/477 R; 358/250; 220/21 A

[56] References Cited

U.S. PATENT DOCUMENTS 3,969,308 7/1976 Penneck ........................ 174/DIG. 1

4,511,927 4/1985 Bauer .................................. 358/250

4,529,905 7/1985 Ohkoshi et al. ........................ 313/35

*Primary Examiner*—David K. Moore

*Assistant Examiner*—Sandra L. O'Shea

*Attorney, Agent, or Firm*—Finnegan, Henderson, Farabow, Garrett and Dunner

[57] ABSTRACT

A cooling system for a projection television receiver, the receiver having at least one cathode ray tube with a face thereon, comprising a lens for focusing light exiting from the tube; a frame supporting the lens in alignment with the face of the tube for defining a cooling chamber between the lens and the face with a fluid therein; and seals for sealing the tube and the lens to the frame in a fluid-tight manner and essentially preventing gas from the fluid sealed in the chamber from exiting the chamber. The seals are preferably of a material which is essentially, impermeable to the passage of the gas, such as co-vulcanized ethylene propylene rubber and polydimethyle siloxane.

6 Claims, 6 Drawing Sheets

COOLING SYSTEM FOR PROJECTION TELEVISION RECEIVER

BACKGROUND OF THE INVENTION

1. Field of the Invention

The present invention generally relates to projection television receivers and particularly relates to a cooling system such in which a fluid is utilized for cooling a projection cathode ray tube in a projection television receiver.

2. Description of Problem To Be Solved

Referring to FIG. 1, a cooling system for a projection television receiver of the same inventor will be described.

In FIG. 1, a frame 22 includes a step portion 22*a*, and a projection face 28 of a projection cathode ray tube 21 is fixed through an adhesive agent 23 to the frame 22 at one side 30 of the step portion 22*a*. A lens 24 has a collar portion 24*a* which is mounted through a packing 25 on the frame 22 at the other side 31 of the step portion 22*a*. A pressing plate 26 is fixed to the frame 22 at its edge portion by screws 27. When the screws 27 are tightened, the lens 24 is urged against the packing 25 to seal the lens to the frame 22 at the step portion 22*a*. The space defined between the projection face 28 of the projection cathode ray tube 21 and the lens 24 is filled with cooling liquid A.

In a structure such as that described above, it is necessary to provide the packing 25 to seal the cooling liquid A in the space between the projection face 28 of the projection cathode ray tube 21 and the lens 24. Silicon rubber has been used with some success as the material of the packing 25. However, silicon rubber is easily permeable to the passage of gas therethrough. Thus, when the cooling liquid is heated by heat generated by the projection cathode ray tube 21, the vapor may pass through the packing 25, and the quantity of the cooling liquid is gradually dissipated. Thus, a picture may be partly cut off unless the cooling liquid is supplemented at regular periods.

Accordingly, it is a primary object of the invention to seal a projection-type television receiver for preventing the loss of cooling liquid therefrom.

It is another object of the present invention to provide a cooling system for a projection television receiver in which a sealing member such as a packing is made of a material which does not allow passage of a gas therethrough, so that if cooling water is heated to generate vapor, the vapor is retained, and a stable picture can be maintained for a long period of time.

SUMMARY OF THE INVENTION

To achieve the foregoing objects and advantages, the cooling system of the present invention is for a projection television receiver including at least one cathode ray tube with a face thereon. The system comprises a lens for focussing light exiting from the tube; frame means supporting the lens in alignment with the face of the tube for defining a cooling chamber between the lens and the face; and sealing means for sealing the tube and the lens to the frame means in a fluid-tight manner and essentially preventing exit of gas from the cooling chamber.

Preferably, the sealing means includes first and second seals for sealing the adjacent surfaces between the face and the frame, and the lens the and frame, respectively.

It is also preferred that the seals comprise a material which is essentially impermeable to the passage of gas, and it is most preferred that the seals be formed of co-vulcanized material of ethylene propylene rubber and polydimethyle siloxane, with a quantity of the former material in the range of about 50 to 95% by weight.

Other objects, features and advantages of the invention will be apparent from the following description taken in connection with the accompanying drawings, or may be learned by practice of the invention.

The term "television receiver" is intended to mean a television receiver, a monitor or the like.

BRIEF DESCRIPTION OF THE DRAWINGS

The accompanying drawings, which constitute a part of the invention, illustrate one embodiment of the invention, and together with the description, serve to explain the principles of the invention. Of the drawings.

DESCRIPTION OF THE PREFERRED EMBODIMENT

Figure 1:
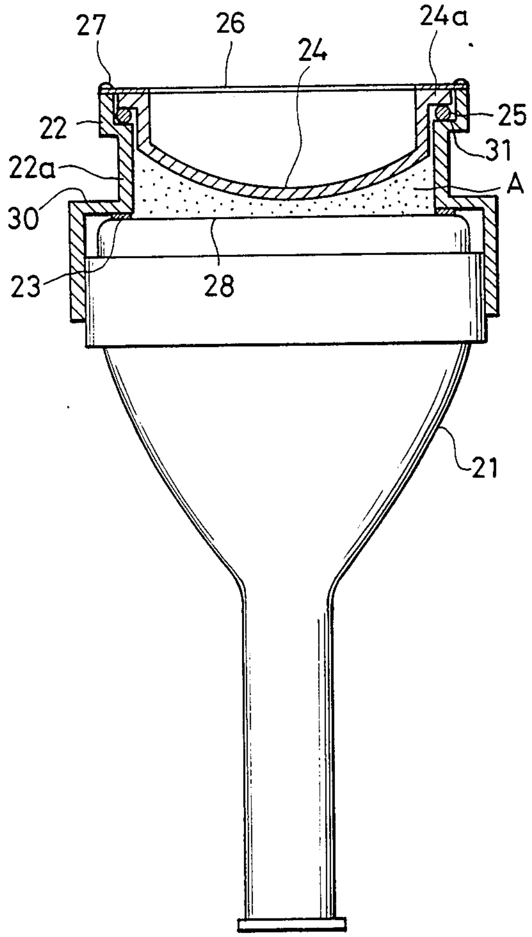
FIG. 1 is a cross-section of the conventional projection cathode ray tube provided with a cooling system.
Figure 2:
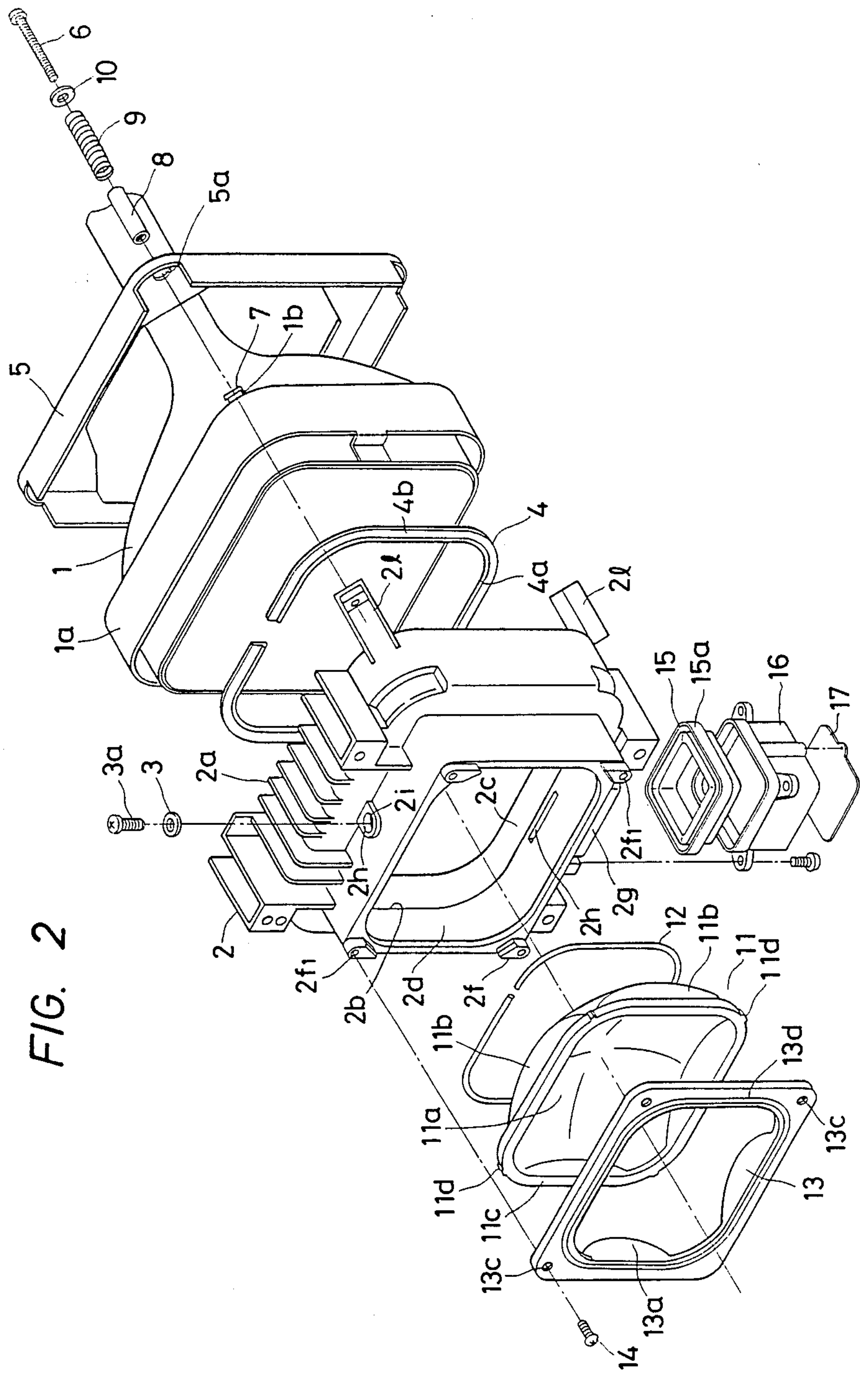
FIG. 2 is an exploded perspective view of the whole of the projection cathode ray tube provided with a cooling system according to the present invention.
Figure 3:
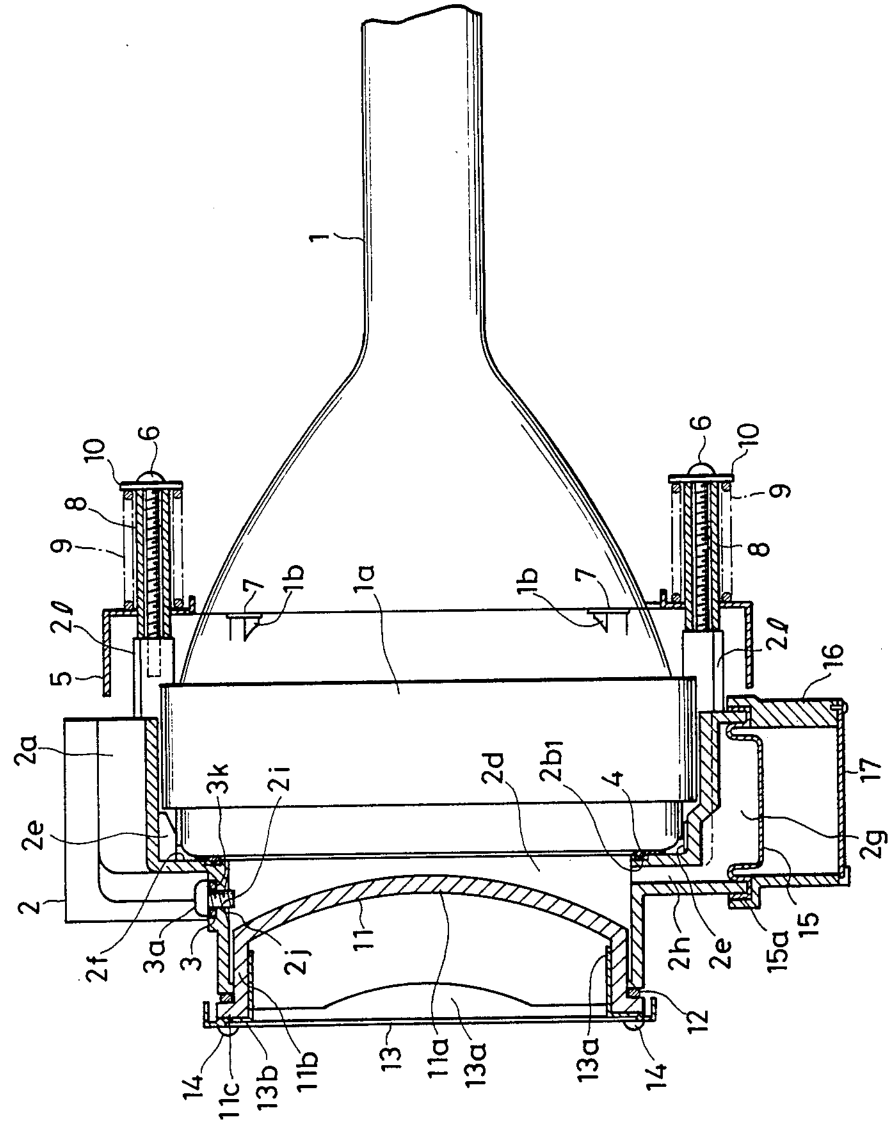
FIG. 3 is a cross-section showing the assembled projection cathode ray tube of FIG. 2.
Figure 4:
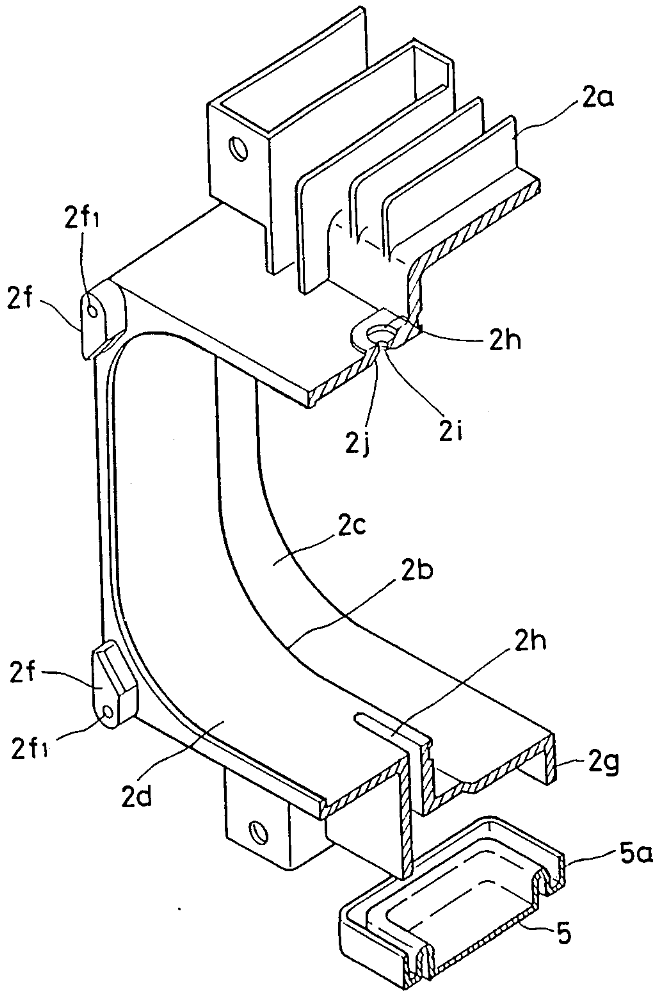
FIG. 4 is perspective cross-section of the frame portion.
Figure 5:
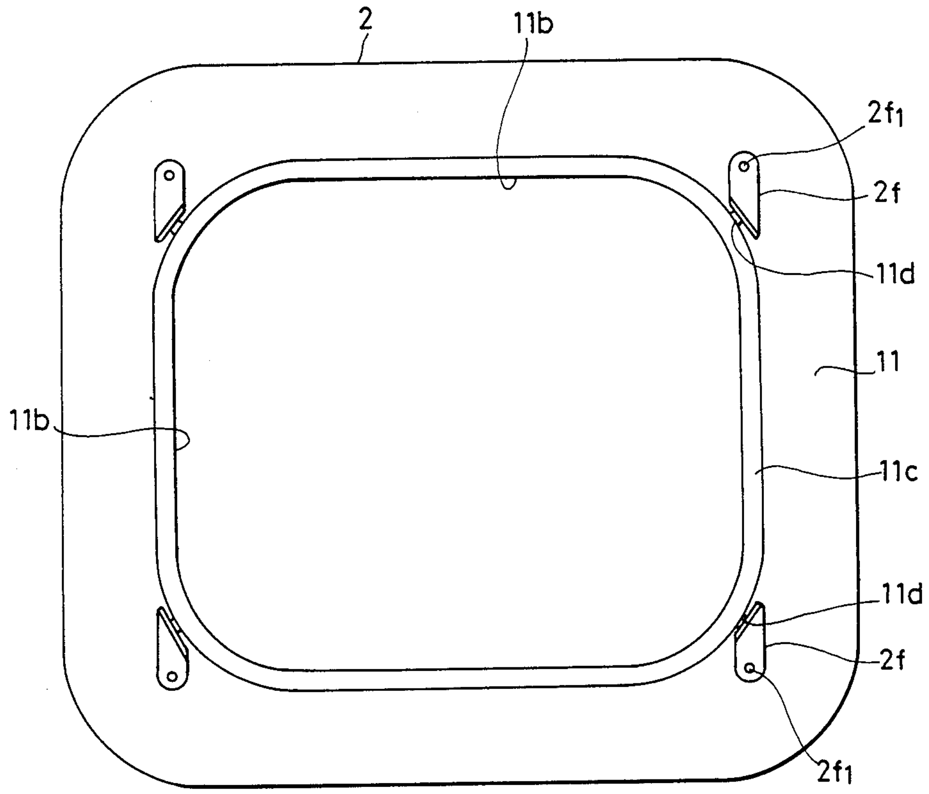
FIG. 5 is a front view showing the state in which the lens is mounted on the frame.
Figure 6:
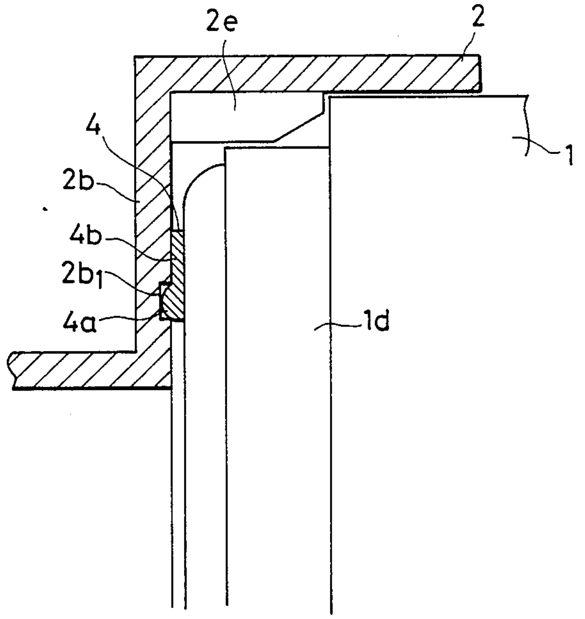
FIG. 6 is an enlarged cross-section of a part of FIG. 3.
Figure 7:
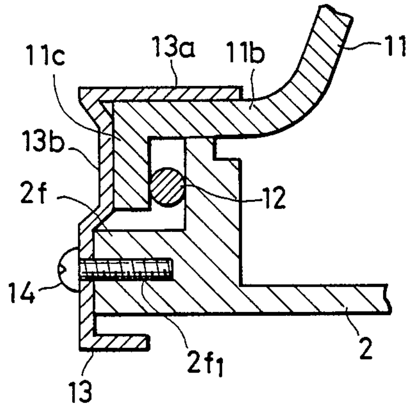
FIG. 7 is an enlarged cross-section of another part of FIG. 3.

Referring to the drawings, the present preferred embodiment now will be described. In the illustrated embodiment, description is made as to one of three monochromatic projection cathode ray tubes constituting a projection television receiver.

In the drawings, a projection cathode ray tube 1 is provided with a metal belt 1a secured to a side edge outer periphery thereof close to a fluorescent screen thereof for interrupting emission of X-rays. A frame 2 of die-cast aluminum is provided with a large number of fins 2*a* formed on an upper portion of an outer peripheral surface thereof. A step portion 2*b* is located at an inner central portion of the frame 2 to form a large-sized chamber 2*c* for mounting the projection cathode ray tube 1 therein. This projection cathode ray tube chamber 2*c* is formed at one side of the step portion 2*b*, and a small-sized chamber 2*d* for enclosing a cooling liquid A (described later), is formed at the other side of the step portion 2*b*.

Respective protrusions 2*e* are formed at the four corners of the inner surfaces of the side walls defining the projection cathode ray tube chamber 2*c*, such that the protrusions 2*e* abut on the side edge outer periphery of the projection cathode ray tube 1. This disposes the projection cathode ray tube 1 in position on the frame 2. Respective protrusions 2*f*, on the other hand, are formed at the four corners of the end surfaces of the side walls defining the cooling liquid chamber 2*d*, such that the protrusions 2*f* abut on small protrusions 11*d* of a lens 11, described later. This disposes the lens 11 in position on the frame 2. Thus, the center line of the projection cathode ray tube 1 is made coincident with that of the lens 11 because the projection cathode ray tube 1 and the lens 11 can be disposed in position on the frame 2. Further, a through hole 2*h* is formed in the frame 2. One end of the through hole 2*h* is opened to the inside of the lower side wall defining the cooling liquid chamber 2*d*, and the other end of the through hole 2*h* is opened to a pressure regulating chamber 2*g* formed under the lower side wall defining the projection cathode ray tube chamber 2*c*. A cooling liquid pouring hole 2*i* is formed at a center portion of the upper side wall defining the cooling liquid chamber 2*d*. The upper surface of the upper side wall is tapered toward the cooling liquid pouring hole 2*i*. The upper side wall also has a lower taper surface 2*j*, tapered to the lower edge of the cooling liquid pouring hole 2*i* so that the upper side wall defining the cooling liquid chamber 2*d* has double taper surfaces. A large diameter hole portion 3*k* is formed at the upper end of the cooling liquid pouring hole 2*i*, so that the packing 3 can be fitted into the large diameter hole portion 3*k*.

A thin-plate ring-like rectangular packing 4 is provided with an expanded inner edge portion 4*a*, which is rectangular in section and which is sized to fit into a slot $2b_1$ formed in the inner surface of the step portion 2*b* of the frame 2.

A metal pressing plate 5 is inserted onto the projection cathode ray tube 1 from the rear for fixing the projection cathode ray tube 1 on the frame 2.

The projection cathode ray tube 1 is inserted into the frame 2 with the projection face of the projection cathode ray tube 1 facing the projection cathode ray tube chamber 2*c* of the frame 2. The projection face of the projection cathode ray tube 1 comes into abutting contact with the packing 4, because the packing 4 has been disposed in the slot $2b_1$ of the step portion 2*b* of the frame 2. The pressing plate 5 is inserted onto the projection cathode ray tube 1 from the rear, and respective screws 6 are inserted into through holes 5*a* of the pressing plate 5 to be tightened into frame attaching pillar portions 2*l*. This fixes the projection cathode ray tube 1 securely on the frame 2. The pressing plate 5 abuts, via elastic materials 7, against supporting portions 1*b* which project from the back surface of the projection cathode ray tube 1. Thus, the projection cathode ray tube 1 is attached onto the frame 2 so that the packing 4 is deformed by the fastening force of the screws 6 (at four corners of the pressing plate 5).

If the pressing force of the projection cathode ray tube 1 exerted onto the whole packing 4 is not uniformly applied, a gap may be partially produced between the projection cathode ray tube 1 and the frame 2. This allows the cooling liquid to leak through the gap even when small amounts of vapor are produced, as will be described later. Therefore, it is necessary to uniformly fasten the pressing plate 5 onto the frame 2. In this embodiment, accordingly, a spacer 8 is inserted into each of the holes 5*a* of the pressing plate 5 so that one end of the spacer 8 abuts on the respective frame attaching pillar portion 2*l*. A spring 9 is fitted onto the outer periphery of the spacer 8 with one end of the spring 9 made to abut on the pressing plate 5. Then, the respective screw 6 with a washer inserted thereto is screwed into the corresponding frame attaching pillar 2*l* through the spacer 8, and fastened so as to make the washer 10 abut against the other end of the spacer 8. This compresses the spring 9. As a result, the pressing plate 5 presses the projection cathode ray tube 1 at four portions thereof by the spring force of the springs 9 to urge the projection cathode ray tube 1 against the packing 4 under a uniform pressing force. Thus, no gap is generated between the step portion 2*b* of the frame 2 and the projection face of the projection cathode ray tube 1.

The lens 11 made of acrylic resin or the like has only one curved surface 11*a* with a predetermined radius of curvature, and includes four sides which are cut-off so as to form right angles between adjacent sides thereof so as to appear rectangular in plan. A perpendicular wall portion 11*b* is formed in each of the four cut-off sides and a collar portion 11*c* is formed integrally with the lens 11 along the whole periphery thereof.

The four corners of the lens surface 11*a* are rounded in order to prevent a crack from being generated at the corner portions when a pressure is applied to the curved surface 11*a* in this embodiment. However, it is not always necessary to round the corners. Further, small protrusions 11*d* are formed at corner portions of the collar portion 11*c* so as to abut on the protrusions 2*f* of the frame 2, respectively.

A packing 12 having a circular cross-section is fitted on the collar portion 11*c* of the lens 11. A metal lens adaptor plate 13 is sized to surround the collar portion 11*c* of the lens 11. Light-shading portions 13*a*, sized for fitting on inner surfaces of the respective perpendicular wall portions 11*b* of the lens 11, are formed integrally with the lens adaptor plate 13. A step portion 13*b*, arranged for mating with the collar portion 11*c* of the lens 11, is formed in the lens adaptor plate 13.

The lens 11 is disposed on the end surface of the side wall constituting the cooling liquid chamber 2*d* of the frame 2 with the curved surface 11*a* made to face the lens adaptor plate 13. The packing 12 is interposed between the collar portion 11*c* of the lens 11 and the end surface of the side wall defining the cooling liquid chamber 2*d*. The small protrusions 11*d* of the lens 11 are made to abut on the side surfaces of the protrusions 2*f* of the frame 2, respectively, to thereby guide the lens 11 in to position on the frame 2.

The lens adaptor plate 13 surrounds the collar portion 11*c* of the lens 11. Respective screws 14 are inserted into holes 13*c* formed in the four corners of the lens adaptor plate 13, and are tightened into screw holes $2f_1$. The holes $2f_1$, are formed in upper surfaces of the protrusions 2*f* of the frame 2. Thus, the lens 11 is securely fixed on the frame 2. The collar portion 11*c* of the lens 11 is attached on the frame 2 in sandwich relationship between the step portion 13*b* of the lens adaptor plate 13 and the packing 12. Thus, only compression stress is exerted onto the collar portion 11*c*, with no bending stress.

Although the step portion 13*b* is formed in the lens adaptor plate 13 in this embodiment, a projection alternatively may be formed on the collar portion 11*c* of the lens 11 at a position opposite to the lens adaptor plate 13.

At least the light-shading portions 13*a* of the lens adaptor plate 13 are made opaque, for example, by being painted black, so that light transmitted through the lens 11 is not reflected by the lens adaptor plate 13.

The pressure regulating chamber 2*g* of the frame 2 is covered with a diaphragm 15. A fastening ring 16 is fitted on the outer periphery 15*a* of the diaphragm 15 and fixed on the frame 2 by screws. Thus, the diaphragm 15 is fixed at an opening portion of the pressure regulating chamber 2*g* of the frame 2 by the fastening ring 16. An opening of the fastening ring 16 is covered by a cap 17.

The functioning of the projection apparatus according to the present invention will now be described.

First, the projection cathode ray tube 1 is mounted onto the projection cathode ray tube chamber 2*c* of the frame 2 having the fins 2*a*. At this time, the packing 4 is disposed in the slot $2b_1$ of the step portion 2*b*, and the projection face of the projection cathode ray tube 1 is caused to abut against the packing 4. In this state, the four-corner portions of the projection cathode ray tube 1 abut against the protrusions 2*e* inwardly projectingly formed on the inner surfaces of the four corners of the projection cathode ray tube chamber 2*c*. Thus the projection cathode ray tube 1 is disposed in position on the frame 2. The pressing plate 5 is then inserted from the rear of the projection cathode ray tube 1, and mounted on the supporting portions 1*b* formed on the back surface of the projection cathode ray tube 1 through the elastic materials 7, respectively. The screws 6, each having the washer 10, the spring 9, and the spacer 8 fitted thereon in that order, are inserted into the respective holes 5*a* of the pressing plate 5 and are screwed into the respective frame attaching pillar portions 2*l*. Further, the screws 6 are tightened so as to make the washers 10 abut on the corresponding spacers 8, thereby fixing the pressing plate 5 and the frame 2 to each other by the spring force of the respective springs 9. Thus, the projection cathode ray tube 1 is pressed at its four corners by the spring force of the springs 9, respectively. Therefore, the projection cathode ray tube 1 is fixed on the step portion 2*b* of the frame 2 in a sealed state by the uniform force. It is easy to dispose the packing 4 in place on the frame 2, because the expanded portion 4*a* of the packing 4 is fitted in the slot $2b_1$ of the step portion 2*b* of the frame 2. Further, the contact area between the projection cathode ray tube 1 and the packing 4 is made large because the expanded portion 4*a* and the flat portion 4*b* of the packing 4 come into contact with the projection cathode ray tube 1, and the expanded portion 4*a* is substantially deformed when the projection cathode ray tube 1 is urged against the expanded portion 4*a*. Therefore, it is possible to keep a fluid-tight seal between the projection cathode ray tube 1 and the step portion 2*b* of the frame 2.

The lens 11 is mounted then onto the frame 2. First, the packing 12 is fitted on the collar portion 11*c* of the lens 11, and the lens 11 is mounted on the frame 2 so as to insert its one side having the packing 12 into the opening of the frame 2, and to insert the other side or curved surface side of the lens 11 into the cooling liquid chamber 2*d* of the frame 2. The small protrusions 11*d* formed at the four corners of the lens 11 are made to abut against the protrusions 2*f* of the frame 2, respectively, to thereby dispose the lens 11 in correct position on the frame 2. Thus, a predetermined positional relationship can be always maintained between the projection cathode ray tube 1 and the lens 11, both of which are disposed in position on the frame 2.

The lens adaptor plate 13 is fitted on the lens 11, and the screws 14 are tightened into the protrusions 2*f* of the frame 2, so that the lens 11 is securely attached onto the frame 2. When the lens 11 is attached onto the frame 2 through this lens adaptor plate 13, the collar portion 11*c* of the lens 11 is sandwiched between the packing 12 and the step portion 13*b* of the lens adaptor plate 13. The packing 12 and the step portion 13*b* are disposed at the opposite side surfaces of the collar portion 11*c*, so that the whole collar portion 11*c* of the lens 11 is pressed uniformly. Accordingly, no bending stress is exerted onto the collar portion 11*c* of the lens 11, so that the lens 11 is not damaged. Further, the lens 11 has a cross section in plan view in the shape of a circle cut at four edges at right angles to be rectangular. Therefore the lens 11 can be reduced in size, even where the lens 11 has a large radius of curvature. Accordingly, it is possible to dispose the projection cathode ray tubes more closely adjacent to each other, so that the respective optical axes of the projection cathode ray tubes are made substantially equal in length to each other. This makes it possible to make the color tone more uniform in intensity.

Further, the lens 11 is shaped to be substantially rectangular in plan view with substantially perpendicular wall portions 11*b*. As a result, there is a possibility that projection light rays from the lens 11 may be reflected by the perpendicular wall portions 11*b* to interfer with other such rays. Therefore, in this embodiment, light-shading portions 13*a* each having a size substantially the same as the perpendicular wall portion 11*b* are formed on the lens adaptor plate 13 and are coated to prevent reflection. The respective light-shading portions 13*a* are arranged on the respective inner surfaces of the perpendicular wall portions 11*b* of the lens 11 to prevent the projection light from being reflected, so that no interfering light is generated.

The diaphragm 15 is fitted onto the pressure regulating chamber 2*g* of the frame 2 and the fastening ring 16 is fastened onto the frame 2 by screws to thereby fix the diaphragm 15 on the frame 2. The cap 17 is attached onto the opening of the fastening ring 16.

The cooling liquid A is poured into the cooling liquid pouring hole 2*i* of the frame 2 so as to fill a space defined by the diaphragm 15, the projection face of the projection cathode ray tube 1, and the curved surface of the lens 11, with the cooling liquid A. There is a possibility that air may remain in an upper portion of the space after the space has been filled with the cooling liquid A. Therefore, in this embodiment, the taper surface 2*j* is formed in the lower surface of the cooling liquid pouring hole 2*i* so that air can be discharged out of the cooling liquid pouring hole 2*i* along the taper surface 2*j*. As a result, air never remains in the space, and the space is completely filled with the cooling liquid A. The packing 3 is attached onto the cooling liquid pouring hole 2*i* by a screw 3*a* to seal the cooling liquid A.

Although the cooling liquid pouring hole 2*i* is sealed by the packing 3 and the screw 3*a* in this embodiment, alternatively, a hollow rubber member with a flange may be used. That is, the hollow rubber member may be inserted into the cooling liquid pouring hole 2*i*, and a plug made of stainless steel, aluminum alloy, brass, or the like, may be fitted into a hollow portion of the hollow rubber member. In this case, an expanded portion is formed on an inner periphery of the hollow portion of the hollow rubber member at a lower portion of the rubber member to be projected down from the lower surface of the cooling liquid pouring hole 2*i*. The expanded portion is extended outward when the plug is tightened into the hollow portion to thereby tightly seal the lower surface of the cooling liquid pouring hole 2*i*. This improves the sealing of the cooling liquid pouring hole 2*i*.

When this cooling liquid A is sealed, if a signal is applied to the projection cathode ray tube 1 and the projection cathode ray tube 1 is heated, the cooling liquid A is expanded. However, the expansion of the cooling liquid A can be absorbed by the diaphragm 15, so that an excess pressure is not applied to the projection cathode ray tube 1 and the lens 11. Further, the temperature of the cooling liquid A is kept lower than a predetermined value, because the cooling liquid A is circulated in the space to be cooled by the frame 2.

Further, if the temperature of the cooling liquid A is increased, the lens 11 is heated and expands to cause the four corners of the lens 11 to abut against the protrusions 2*f* of the frame 2, respectively. Thus, stress is exerted onto the lens 11 creating a risk of damage of the lens 11. In this embodiment, however, the small protrusions 11*d* are formed at the four corners of the lens 11, respectively, so that the small protrusions may be deformed to avoid any stress exerted on the lens 11, and to prevent the lens 11 from being damaged.

According to the present invention, the sealing member constituted by the packings 3, 4, and 12 and the diaphragm 15 for sealing the cooling liquid A is made of a co-vulcanized material of ethylene propylene rubber and polydimethyl siloxane, the quantity of the ethylene propylene rubber being preferably in the range of about 50–95% by weight.

In the case of using the sealing member made of the above-mentioned material according to the present invention, the quantity of evaporation of the cooling liquid is 11 mg per day, as compared with 188 mg per day in the case of a sealing member made of silicon rubber. Thus, the present invention has a degree of sealing about 17 times larger than that of the inventor's previous version. Further, the material according to the present invention has properties of X-ray resistance, heat resistance, cold resistance, chemical resistance, and pressure resistance, and therefore, it is optimum for the sealing member for sealing the cooling liquid A.

As described above, according to the present invention, since the sealing member for sealing cooling water for the projection cathode ray tube is made of a co-vulcanized material of ethylene propylene rubber and polydimethyl siloxane, the gas permeability of the member is very poor and the vapor generated from the cooling water when it is heated hardly passes through the sealing member. Accordingly, a stable picture can be obtained for a long period of time, the supplement of cooling water can be made substantially unnecessary, and the sealing member can be used under any typical conditions or circumstances.

It is understood that various modifications and variations could be made in the invention without departing from the scope or spirit of the invention.

What is claimed is:

1. A cooling system for a projection television receiver, the receiver including at least one cathode ray tube having a face, comprising:

a lens for focusing light existing from said tube;

frame means for supporting said lens in alignment with the face of said tube for defining a cooling chamber between said lens and said face;

sealing means, including a pressing plate and means for exerting uniform pressure by said pressing plate against a packing disposed between said tube and said pressing plate, for sealing said tube and said lens to said frame means in a fluid-tight manner and essentially preventing gas from existing said cooling chamber; and means for filling said chamber with a coolant, wherein said frame means includes an upper side wall having double taper surfaces adjacent said filling means.

2. The cooling system of claim 1 wherein said frame means includes a frame having opposing open sides for receiving said tube face and said lens in close-fitting relation, respectively, and said sealing means includes first and second seals, for sealing the adjacent surfaces between said face and said frame, and said lens and said frame, respectively.

3. The cooling system of claim 2 wherein said seals each comprise a material which is essentially impermeable to the passage of gas.

4. The cooling system of claim 3 wherein said seals are co-vulcanized material of ethylene propylene rubber and polydimethyl siloxane.

5. The cooling system of claim 4 wherein the quantity of ethylene propylene rubber in said seals is in the range of about 50 to 95% by weight.

6. The cooling system of claim 4 wherein the quantity of polydimethyl siloxane is less than about 10% by weight.

* * * * *